(12) United States Patent  (10) Patent No.: US 9,033,353 B2
Horton  (45) Date of Patent: May 19, 2015

(54) RECONFIGURABLE FIXED SUSPENSION SEMI-TRAILER, FLATBED OR CHASSIS

(75) Inventor: Robert Horton, Kingwood, TX (US)

(73) Assignee: Texas Trailer Partners LLC, Kingwood, TX (US)

( * ) Notice: Subject to any disclaimer, the term of this patent is extended or adjusted under 35 U.S.C. 154(b) by 0 days.

(21) Appl. No.: 13/404,794

(22) Filed: Feb. 24, 2012

(65) Prior Publication Data

US 2012/0248729 A1  Oct. 4, 2012

Related U.S. Application Data

(63) Continuation-in-part of application No. 13/064,604, filed on Apr. 4, 2011.

(51) Int. Cl.
*B62D 53/06* (2006.01)
*B62D 61/00* (2006.01)
*B60G 9/00* (2006.01)

(52) U.S. Cl.
CPC .............. *B62D 53/06* (2013.01); *B62D 53/068* (2013.01); *B62D 61/00* (2013.01); *B60G 9/003* (2013.01); *B60G 2300/40* (2013.01)

(58) Field of Classification Search
CPC ..... B62D 53/068; B62D 21/14; B62D 63/061
USPC ........... 280/149.2, 407.1, 656, 638; 180/209; 296/26.09, 26.08; 414/477, 478, 479
See application file for complete search history.

(56) References Cited

U.S. PATENT DOCUMENTS

| | | | | | |
|---|---|---|---|---|---|
| 2,676,815 | A | * | 4/1954 | Bennett | 280/81.1 |
| 2,682,419 | A | * | 6/1954 | Wolf | 280/407.1 |
| 3,812,791 | A | * | 5/1974 | Barnard | 410/44 |
| 3,937,516 | A | * | 2/1976 | Chapman | 296/26.08 |
| 4,111,451 | A | * | 9/1978 | Pinto | 280/408 |
| 4,132,326 | A | * | 1/1979 | Pinto | 414/536 |
| 4,353,565 | A | * | 10/1982 | Smith et al. | 280/149.2 |
| 5,035,439 | A | * | 7/1991 | Petrillo | 280/81.6 |
| 6,834,874 | B1 | * | 12/2004 | Overby | 280/124.116 |
| 2006/0181063 | A1 | * | 8/2006 | Eddings | 280/656 |

* cited by examiner

*Primary Examiner* — Keith Frisby
(74) *Attorney, Agent, or Firm* — Juan Carlos A. Marquez; Bacon & Thomas PLLC

(57) ABSTRACT

A reconfigurable fixed position suspension and support structure attached to the trailer body using a locking device consisting of pins, bolts and/or other fastening devices. The support structure has a removable locking device that when attached to the support structure locks the support structure and suspension into a fixed position relative to the trailer body. When the trailer is not in operation, the locking device can be removed allowing the suspension group to be reconfigured, and each suspension to be repositioned relative to the trailer body. The removable locking device is then reattached to the suspension support structure locking the support structure and suspension into a new fixed position relative to the trailer body.

15 Claims, 12 Drawing Sheets

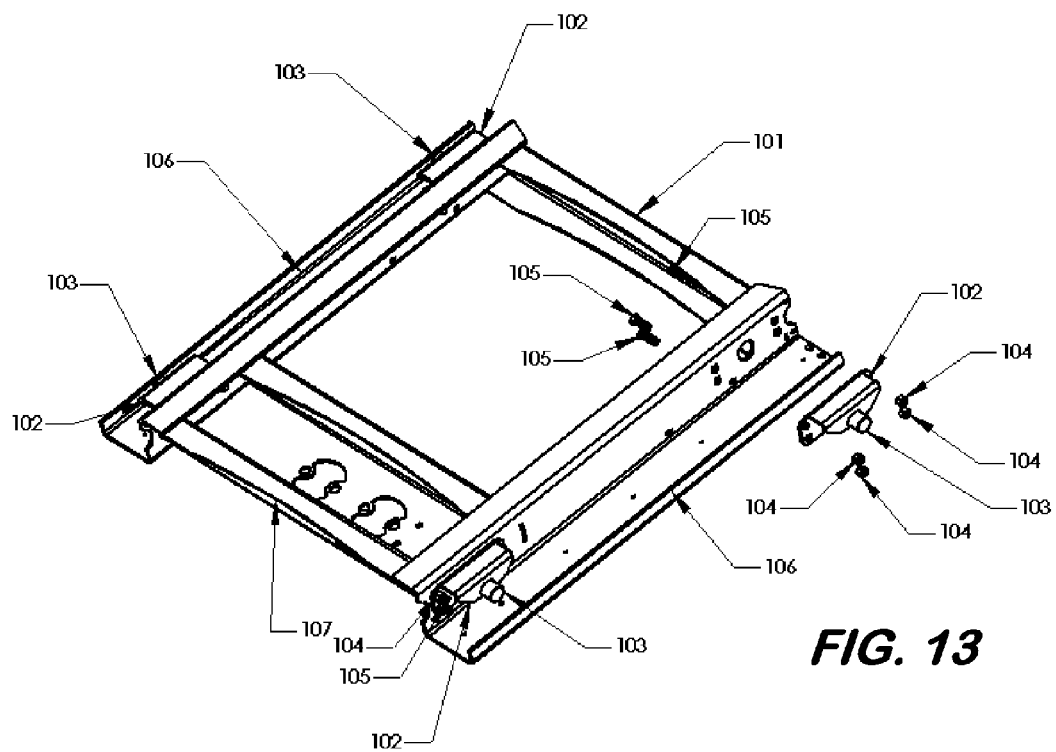
FIG. 13
FIG. 14
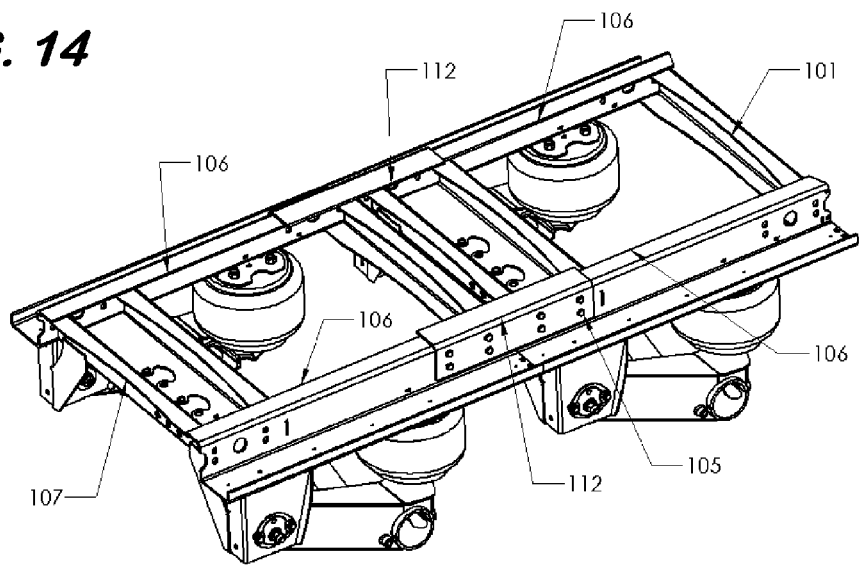

RECONFIGURABLE FIXED SUSPENSION SEMI-TRAILER, FLATBED OR CHASSIS

CROSS-REFERENCE TO RELATED APPLICATION

This application is a Continuation-in-Part of U.S. application Ser. No. 13/064,604 filed Apr. 4, 2011.

TECHNICAL FIELD

Exemplary embodiments of the present invention relate to semi-trailer, flatbed or chassis suspension systems. More specifically, exemplary embodiments relate to suspension systems where the suspension is in a fixed position relative to the trailer body and where the suspension position can not be changed during operation.

BACKGROUND OF THE INVENTION

Semi-trailers, flatbed trailers and chassis typically have a suspension that is considered to be either a fixed suspension or a sliding suspension. Fixed suspensions are typically attached to the trailer body in such a way that their position relative to the trailer body is considered a permanent configuration. Fixed suspensions are typically attached to the trailer body by welding or bolting the suspension rigidly into place. Sliding suspensions are typically attached to the trailer body in such a way that their position relative to the trailer body can be changed during operation. Sliding suspensions are typically attached to the trailer body using movable sub-frames commonly referred to as sliders. Sliding suspensions typically have a retractable pin mechanism that enables selective positioning of the slider relative to the trailer body during vehicle operation.

A prior art slider for a semi-trailer is indicated generally at 20 and is shown in FIG. 1. Slider 20 is movably mounted on trailer body 40 (FIGS. 3-4) by slidable engagement of rail guides to the trailer body main rails.

A prior art fixed suspension is shown in FIGS. 5-6. A typical fixed suspension is attached to the trailer body in fixed locations in such a way as dimensions A and B in FIG. 5 can not be changed.

SUMMARY OF THE INVENTION

Exemplary embodiments of the present invention are directed to a removable suspension support structure that is selectively positioned and secured to the trailer body with removable pins. The pin assembly engages openings in the trailer body and is secured to the support structure with bolts. The suspension support structure comprises two longitudinal members that engage the lower flanges of the trailer body main beam rails. The two longitudinal members are connected to each other in a spaced-apart parallel relationship by crossmembers which extend between the main members.

The above-described and other features and advantages of the present disclosure will be better appreciated and understood by those skilled in the art with reference to the following detailed description, drawings, and appended claims. Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIG. 13 is an exploded perspective view of an alternative implementation of the exemplary support structure of FIG. 10 that employs the exemplary pin assembly of FIG. 12;

FIG. 14 is a perspective view of an exemplary embodiment of the present invention in which a pair of support structures with corresponding suspensions are mounted end to end in a closed tandem configuration and secured together;

Figure 1:
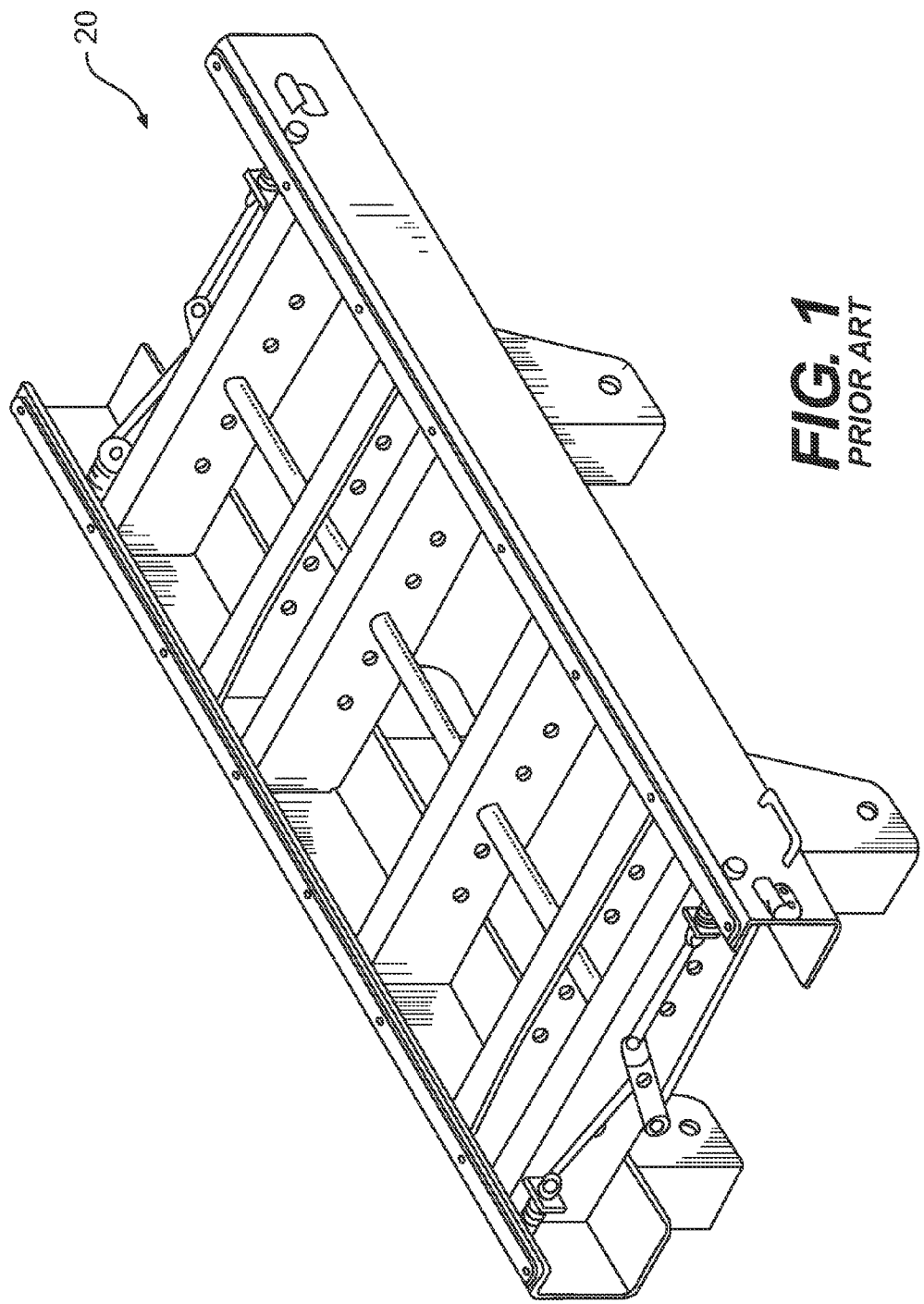
FIG. 1 is a perspective view of a conventional prior art slider for a semi-trailer having a plurality of transversely extending parallel cross members, showing the retractable pin mechanism used to selectively locate the slider along the underside of a trailer while the trailer is in operation.
Figure 2:
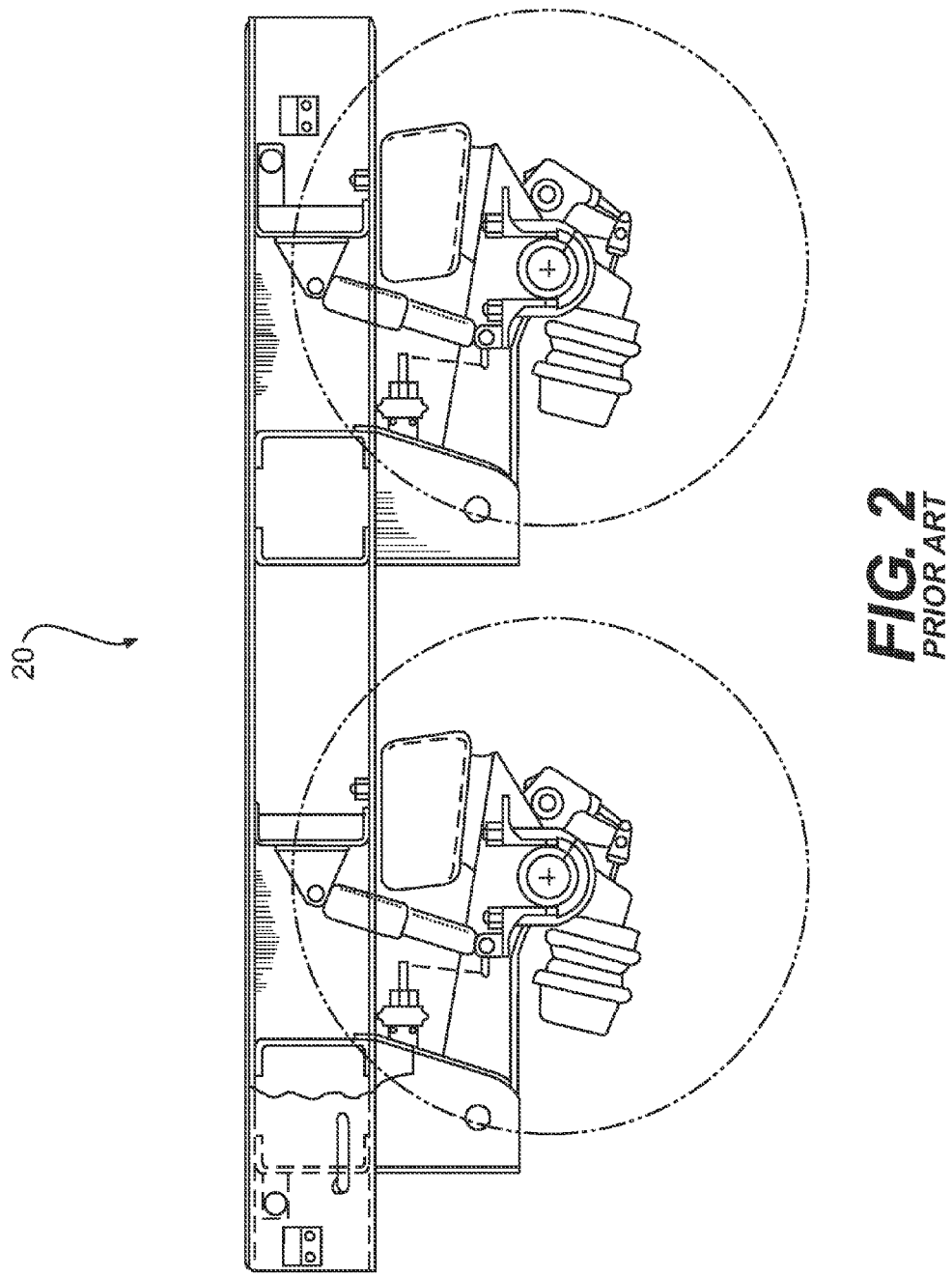
FIG. 2 is a fragmentary elevational view of the prior art slider illustrated in FIG. 1, but showing the axle/suspension systems, with the wheels/tires and hidden parts represented by broken lines.
Figure 3:
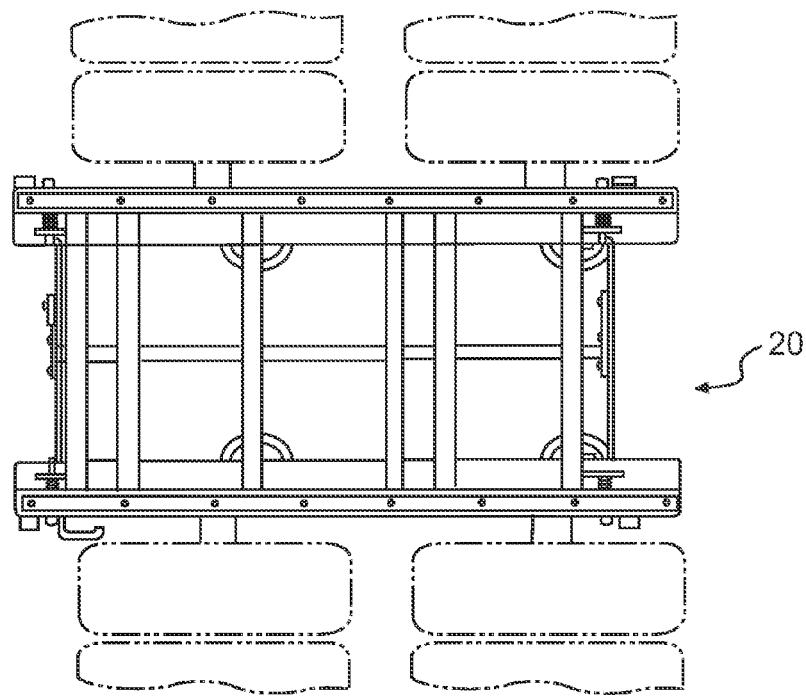
FIG. 3 is a reduced-size fragmentary top plan view of the prior art slider shown in FIG. 2.
Figure 4:
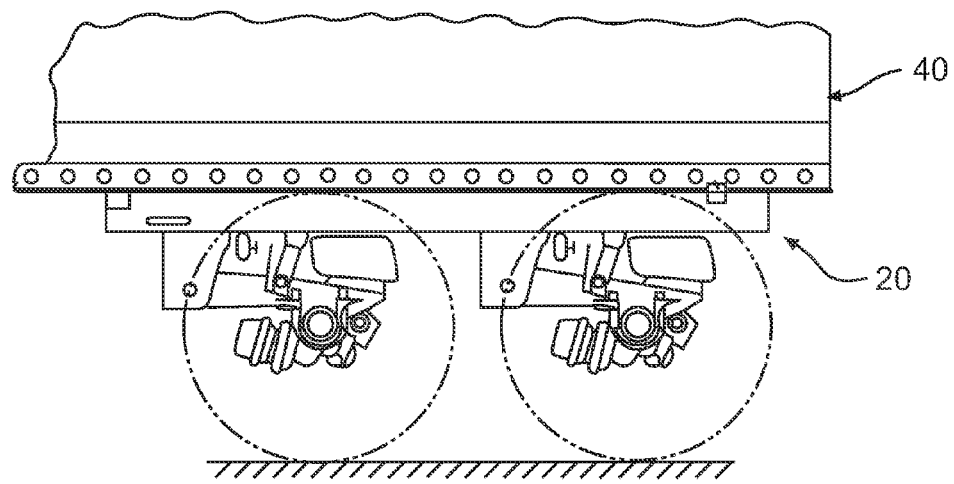
FIG. 4 is a fragmentary elevational view, showing the prior art slider of FIG. 3 movably mounted on the underside of a trailer body.
Figure 5:
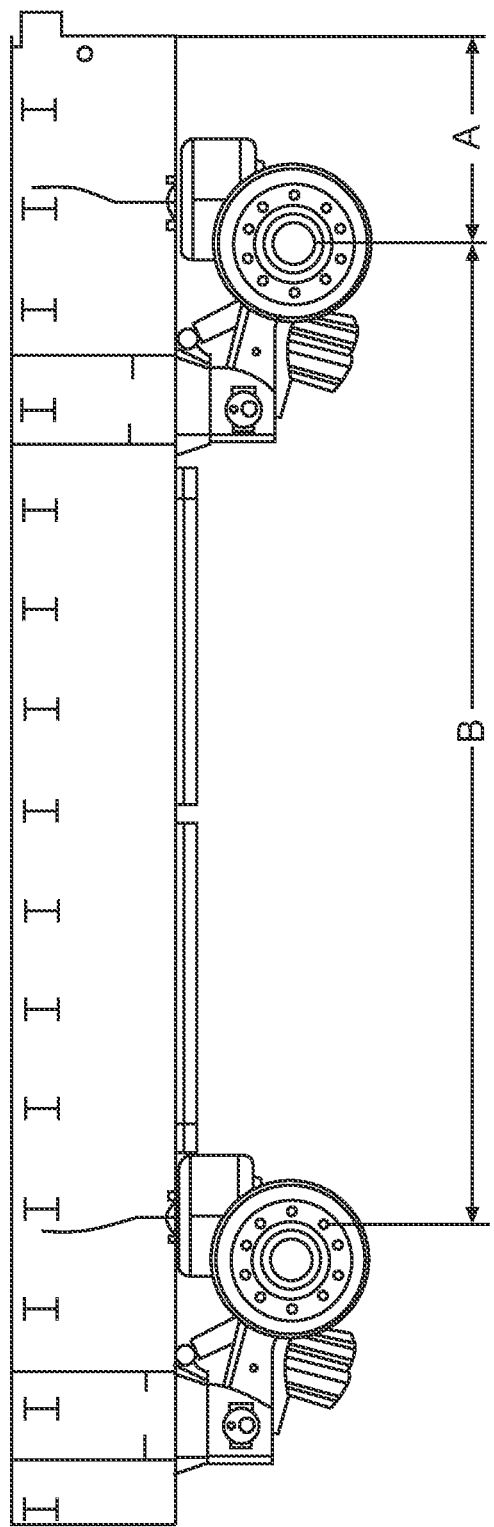
FIG. 5 is a fragmentary elevational view of a prior art fixed suspension installation showing the crossmembers and gussets required for support.
Figure 6:
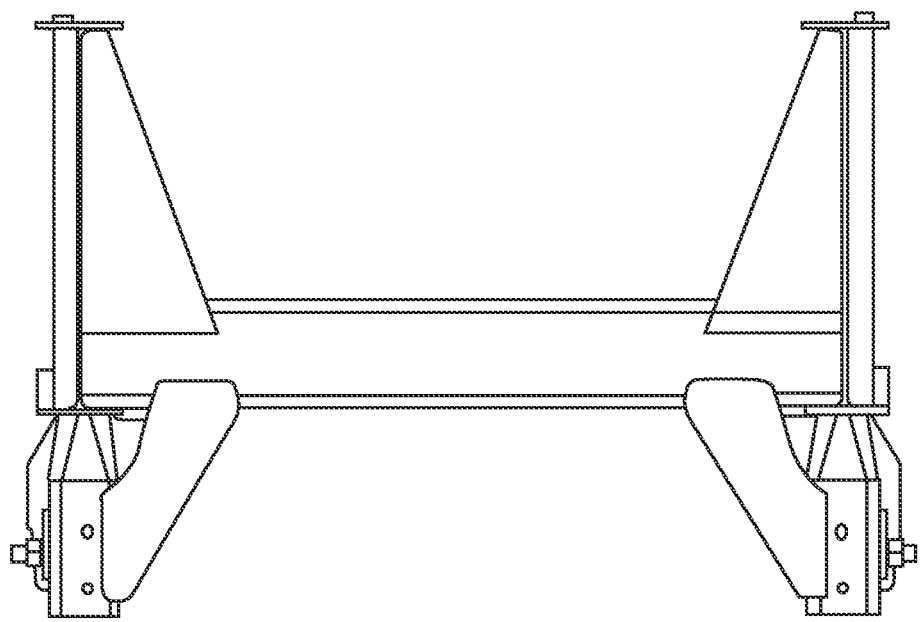
FIG. 6 is a fragmentary front end view of the prior art fixed suspension shown in FIG. 5 with the axle systems removed for clarity.

The detailed description explains exemplary embodiments of the present invention, together with advantages and features, by way of example with reference to the drawings, in which similar numbers refer to similar parts throughout the drawings. The diagrams depicted herein are just examples to be regarded as illustrative in nature and not as restrictive. There may be many variations to these diagrams described therein without departing from the spirit of the invention. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form, and it will be apparent to those skilled in the art that the present invention may be practiced without these specific details. Further, the terms and phrases used herein are not intended to be limiting but rather to provide an understandable description of the invention.

Exemplary embodiments of a removable suspension support structure in accordance with the present invention will now be described with reference to the drawings. Exemplary embodiments of the present invention may be implemented to provide a more cost effective solution to replacing and/or adding a fixed position suspension to a new or previously used semi-trailer, flatbed or chassis. Exemplary embodiments may also be implemented to provide a more cost effective solution to adding an additional fixed position suspension, referred to as a third axle, to a trailer initially configured in a widespread or closed tandem arrangement.

More particularly, exemplary embodiments of the present invention can be implemented to provide a fixed position suspension and support structure that is secured to the trailer in such a way as to allow the suspension and/or support structure to be configured and/or reconfigured in selective positions relative to the trailer body and/or other fixed, movable or sliding suspensions. For instance, such a fixed position suspension and support structure assembly can, in exemplary embodiments, be secured to the trailer with a locking device that locks the assembly into a fixed position relative to the trailer body. When the trailer is not in operation, each suspension support structure assembly can be detached from the trailer body, repositioned relative to the trailer body, and reattached to the trailer body in a different fixed position relative to the trailer body.

Figure 7:
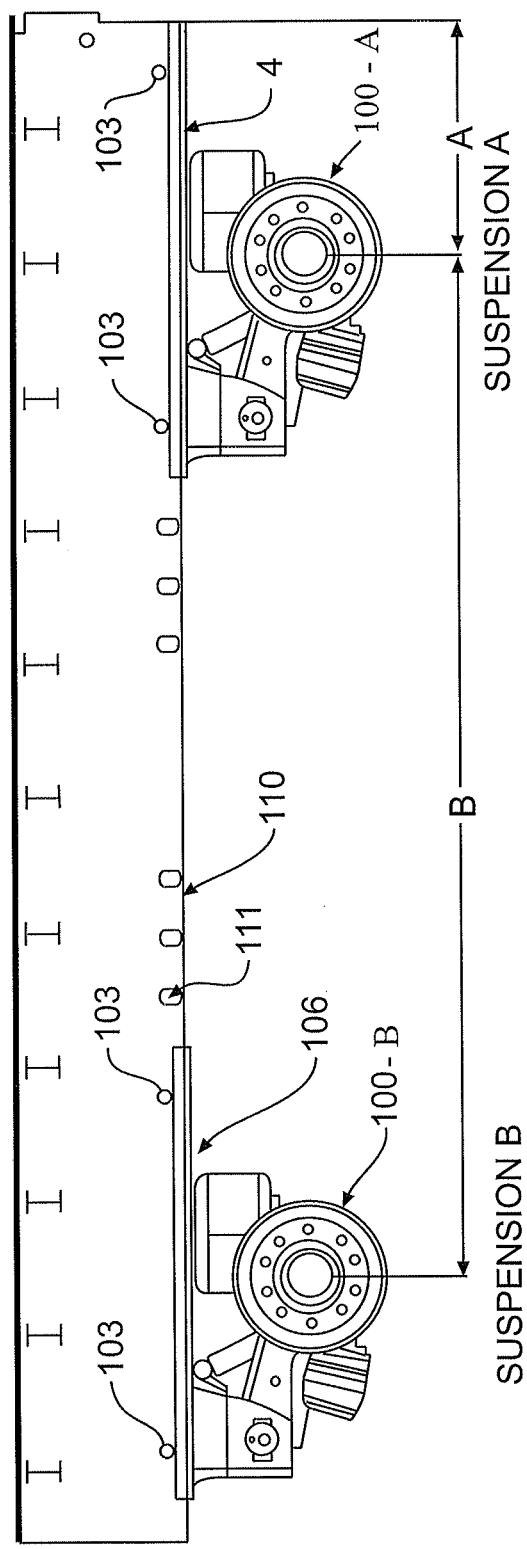
FIG. 7 is a fragmentary elevational view of an exemplary embodiment of the present invention in which two separate suspensions are mounted in a wide spread configuration.
Figure 8:
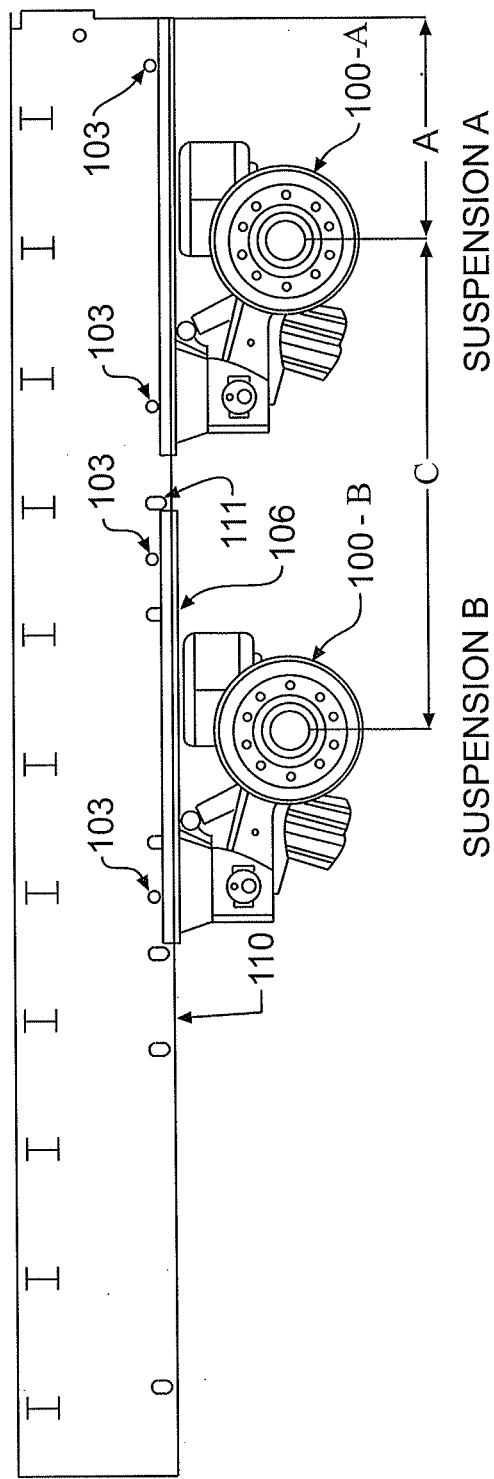
FIG. 8 is a fragmentary elevational view of an exemplary embodiment of the present invention in which two separate suspensions are mounted in a closed tandem configuration.

A first exemplary embodiment of the present invention is shown in FIGS. 7-11. In FIG. 7 a widespread configuration is shown where suspension 100-A is fixed at a distance A from the rear of the trailer body and suspension 100-B is fixed at a distance B from suspension 100-A. FIG. 8 shows the same suspension group after suspension 100-B has been removed, reconfigured and fixed at a distance C from suspension 100-A. Each suspension is fixed in position by pins 103 that engage the suspension support structures longitudinal members 106, pin support 102 and the trailer body web 111. The longitudinal members 106 of the support structures also engage the trailer body lower beam flanges 110 to provide latitudinal support.

Figure 9:
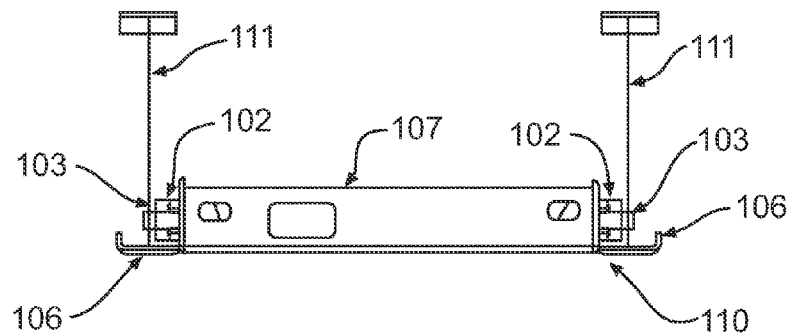
FIG. 9 is a close-up front end view of longitudinal members of exemplary support structures shown attached to the main beams of a trailer body.
Figure 10:
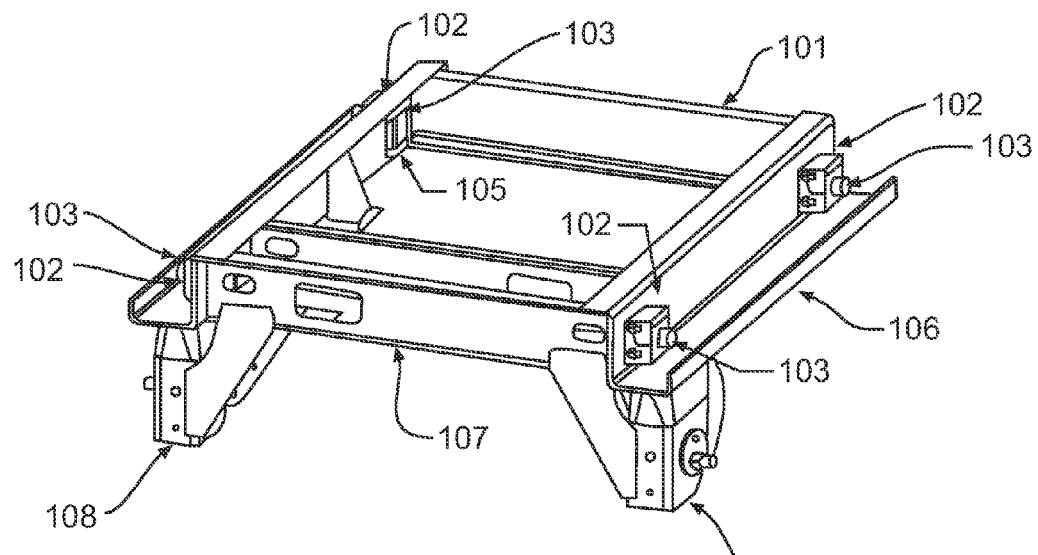
FIG. 10 is a perspective view of the exemplary support structure of FIG. 9 in which a pin assembly and pin supports assembled and a set of exemplary suspension hangers are attached to the exemplary support structure.
Figure 11:
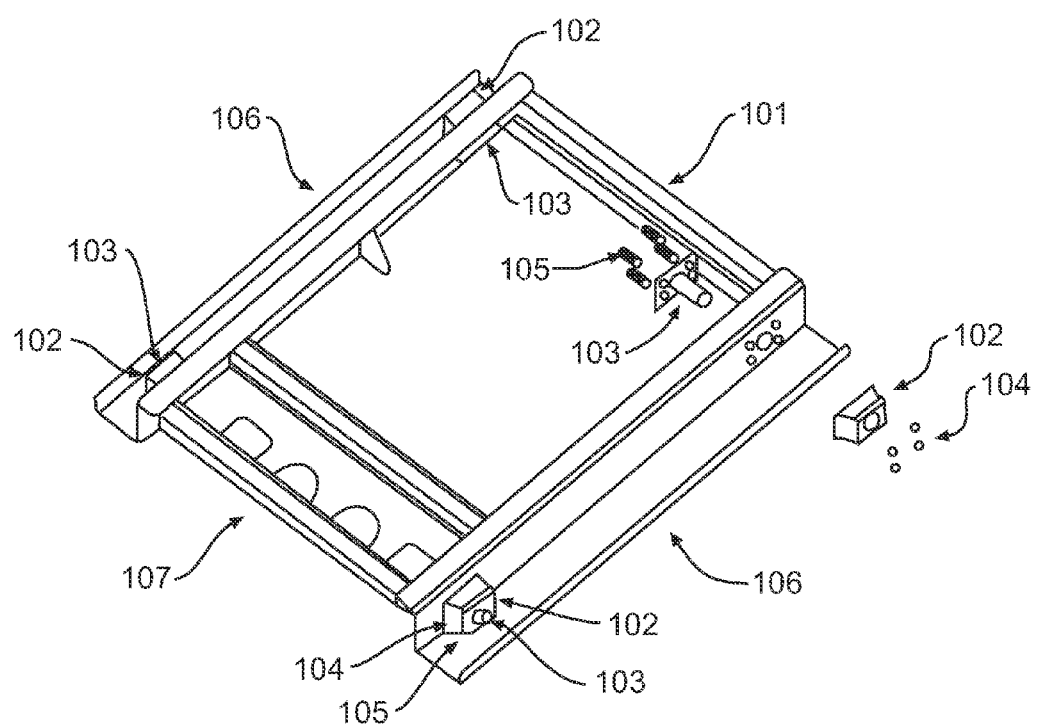
FIG. 11 is a perspective view of the present invention showing an exploded view of the exemplary support structure of FIG. 10.

The two longitudinal members 106 of the support structure are connected in a spaced apart parallel relationship by support structure crossmembers 107 and 101 which extend between and are perpendicular to the two longitudinal members 106 (FIGS. 9-11). Crossmembers 107 and 101 are secured to longitudinal members 106 by means of welding or mechanical fastening.

Suspension hangers 108 depend from the support structure assembly to allow a suspension trailing arm and axle assembly to be mounted to each support structure assembly and are secured to the support structure longitudinal members 106 and the support structure crossmember 107 by welding and/or mechanical fastening.

Each pin assembly 103 is secured to a support structure longitudinal member 106 with four mechanical fasteners 105, 104. The four mechanical fasteners 105, 104 also align the pin support 102 with the pin assembly 103 and secure the pin support to the longitudinal member 106.

In the present exemplary embodiment to provide a fixed installation of the suspension support structure assembly, the support structure assembly is selectively positioned on the trailer body. Each pin assembly 103 is aligned with the respective holes in the longitudinal member 106, pin support 102 and trailer body web 111. Four mechanical fasteners 105, 104 are then used to secure each pin assembly 103 and pin support 102 to the longitudinal members 106. After installation of the mechanical fasteners 105, 104 the position of the suspension and suspension support structure is fixed relative to the trailer body.

When requirements change, the trailer can be taken out of service by removing mechanical fasteners 105, 104, thereby allowing the pin assembly 103 and pin support 102 to be removed and the suspension support structure to be removed from the trailer. The suspension support structure and suspension may then be reconfigured and repositioned relative to the trailer body. Each pin assembly 103 is then re-aligned with its respective hole in the longitudinal member 106, the pin support 102 and a new hole location in the trailer body web 111. Four mechanical fasteners 105, 104 are then used to secure each pin assembly 103 and pin support 102 to the longitudinal members 106. After installation of the mechanical fasteners 105, 104 the position of the suspension and suspension support structure is fixed relative to the trailer body.

Figure 12:
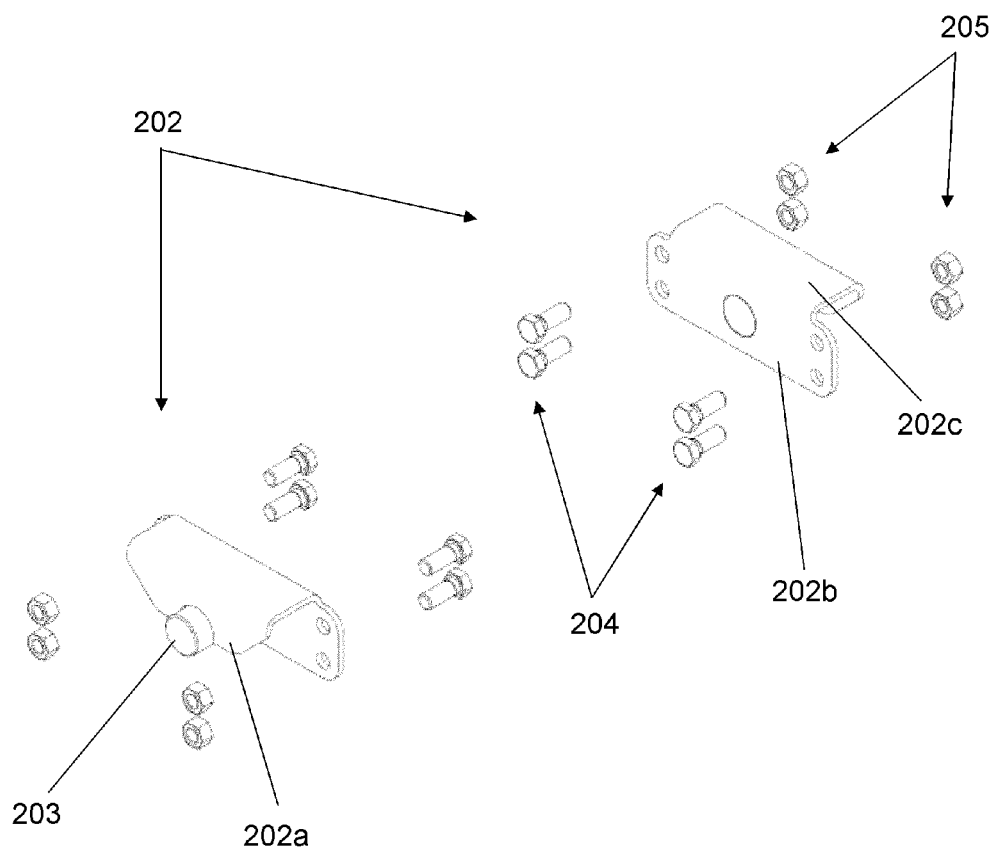
FIG. 12 is an exploded perspective view of alternative exemplary embodiment of a pin support assembly that can be employed in an alternative implementation of the exemplary support structure of FIG. 10 for engaging the longitudinal members with the trailer body web.

An alternative embodiment of a pin support 202 that can be employed for engaging the longitudinal members 106 of suspension support structures with the trailer body web 111 is illustrated in FIG. 12. FIG. 13 illustrates an alternative exemplary embodiment in accordance with the present invention in which the suspension support structure of FIG. 10 is implemented to utilize the exemplary pin support 202 of FIG. 12.

In this alternative embodiment, the pin support 202 is implemented with a pin cage structure that is integrally formed of a first vertically extending flange 202a and a second vertically extending flange 202b that are connected by a transverse section 202c. As shown in FIG. 13, each pin support 202 is configured to be secured to a longitudinal member 106 with four mechanical fasteners 205, 204 that engage the second flange 202b of the pin support 202, and a pin 203 projects from the first flange 202a for securing the pin support 202 with the trailer body web 111.

After installation of the mechanical fasteners 205, 204, the position of the suspension and suspension support structure can be fixed relative to the trailer body web 111. In contrast to the use of the pin assembly 103 in conjunction with the pin support 102 illustrated in FIGS. 9-11, however, it is not necessary for the pin 203 of the pin support 102 to be aligned with the longitudinal member 106 and the pin support 102. Rather, to provide a fixed installation of the suspension support structure assembly, the pin 203 is simply aligned with the respective hole in the trailer body web 111 when the support structure assembly is selectively positioned on the trailer body.

Figure 15:
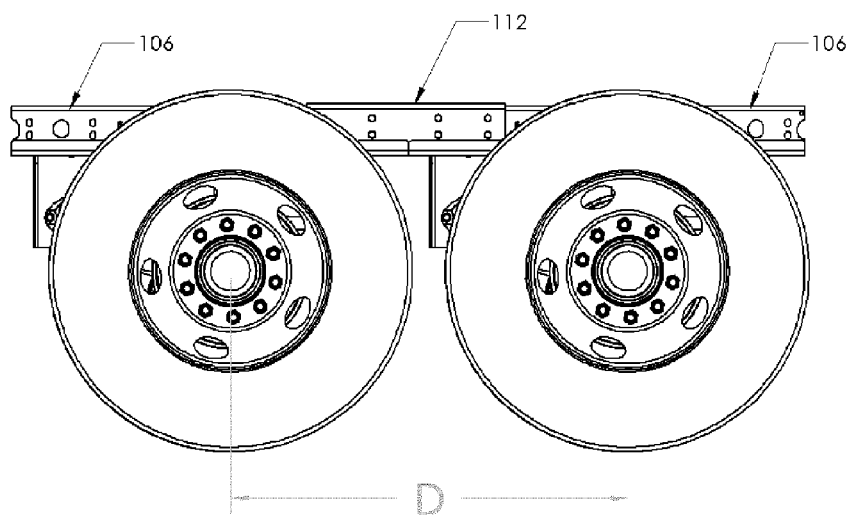
FIG. 15 is a fragmentary elevational view of the exemplary configuration for a pair of support structures in which wheels are mounted on the corresponding suspensions.
Figure 16:
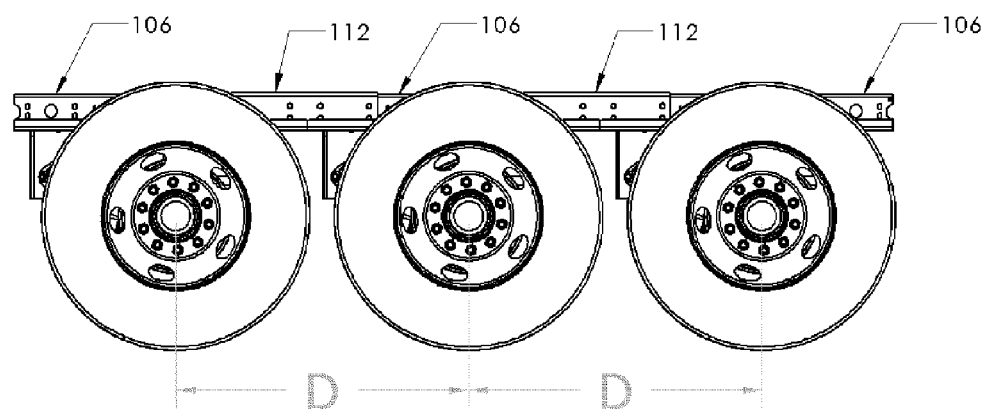
FIG. 16 is a fragmentary elevational view of an exemplary embodiment of the present invention in which three support structures with corresponding suspensions are mounted end to end in a closed tandem configuration and secured together and in which wheels are mounted on the corresponding suspensions.

Referring now to FIGS. 14 and 15, an exemplary embodiment of the present invention in which a pair of support structures with corresponding suspensions are mounted end to end in a closed tandem configuration and secured together to create a multi-axle suspension support structure. More specifically, as best illustrated in FIG. 14, the two suspension support structures are joined together by aligning the longitudinal member 106 of each structure end to end and fastening them together using attachment part 112. More specifically, the attachment part 112 can be engaged with the corresponding joined ends of the suspension support structures using, for example, the mechanical fasteners 105, 104 where the corresponding joined ends are otherwise configured to allow for the mechanical fasteners 105, 104 to be used to secure each pin assembly 103 and pin support 102 to the longitudinal members 106 and the corresponding joined ends. Similarly, FIG. 16 illustrates an exemplary embodiment in which three separate embodiments are mounted end to end in a closed tandem configuration and secured together using two attachment parts 112 to create a tri-axle suspension support structure.

In this manner, exemplary embodiments of the present invention can be implemented to create a multi-axle fixed suspension support apparatus by connecting two or more fixed suspension support structures end to end using multiple attachment parts 112. Similar to each individual suspension support structure of the exemplary embodiments described above with reference to FIGS. 7-13, when a trailer is not in operation, such a multi-axle fixed suspension support structure apparatus can be detached from the trailer body, repositioned relative to the trailer body, and reattached to the trailer body in a different fixed position relative to the trailer body.

Moreover, in alternative exemplary embodiments, two or more fixed suspension support structures can be connected end to end in the manner described above to convert the fixed suspension support structures to a movable suspension support apparatus that allows for the position of the movable suspension support apparatus to be changed relative to the trailer body during vehicle operation. For example, the two outer ends of the set of connected suspension support structures that are not connected to a corresponding end of another suspension support structure can be each implemented with a retractable pin mechanism that enables selective positioning of the connected set of suspension support structures relative to the trailer body.

In embodiments in which a multi-axle suspension support apparatus is implemented as described above, as further indicated in FIGS. 15 and 16 (in which wheels are also shown as being mounted on the corresponding suspensions), each suspension is fixed at a distance D from each other suspension to which it is adjacent. In exemplary embodiments, this configuration can enable the distance D between each axle to be 49 inches or less. That is, in contrast to conventional single axle subframes for movable suspensions in which the distance between axles is approximately 54 inches, exemplary embodiments of the present invention can be implemented to provide for a configuration in which two or more reconfigurable fixed suspension support structures can be connected end to end to create a movable multi-axle suspension support structure that meets the industry standard for closed tandem configurations of approximately 48-49 inches between axles, thereby enabling a trailer that utilizes a movable suspension structure to have a tighter turning radius and decreased wear on tires.

While the invention has been described in detail with reference to exemplary embodiments, it will be understood by those skilled in the art that various changes and alternations may be made and equivalents may be substituted for elements thereof without departing from the scope of the invention as defined by the appended claims. In addition, many modifications may be made to adapt a particular application or material to the teachings of the invention without departing from the essential scope thereof.

Variations described for exemplary embodiments of the present invention can be realized in any combination desirable for each particular application. Thus particular limitations, and/or embodiment enhancements described herein, which may have particular limitations need be implemented in methods, systems, and/or apparatuses including one or more concepts described with relation to exemplary embodiments of the present invention.

Therefore, it is intended that the invention not be limited to the particular embodiments disclosed as the best mode contemplated for carrying out this invention, but that the invention will include all embodiments falling within the scope of the present application as set forth in the following claims, wherein reference to an element in the singular, such as by use of the article "a" or "an" is not intended to mean "one and only one" unless specifically so stated, but rather "one or more." Moreover, no claim element is to be construed under the provisions of 35 U.S.C. §112, sixth paragraph, unless the element is expressly recited using the phrase "means for" or "step for." These following claims should be construed to maintain the proper protection for the present invention.

What is claimed is:

1. A suspension support apparatus for a chassis structure of a tractor vehicle, the chassis structure of the tractor vehicle having first and second longitudinally-extending and laterally spaced-apart beam structures, the first and second longitudinally-extending and laterally spaced-apart beam structures each having a plurality of engagement locations, the suspension support apparatus comprising:

first and second longitudinally-extending and laterally spaced-apart ribs configured to be selectively positioned and aligned with any of the plurality of engagement locations formed on the first and second longitudinally-extending and laterally spaced-apart beam structures, each of the first and second ribs being L-shaped in cross-section and each having a first vertical surface, a second vertical surface on an opposite side of the rib from the first surface and a third horizontal surface, the first surface of the first rib and the first surface of the second rib facing each other and the second surface of the first rib and the second surface of the second rib facing away from each other, the third horizontal surface of the first and second ribs each defining a channel portion facing away from each other, each of the first and second beam structures being I-beam shaped in cross-section and each having at least a first vertical side, a second vertical side opposite the first side and a third horizontal side, the first side of the first beam structure and the first side of the second beam structure facing each other and the second side of the first beam structure and the second side of the second beam structure facing away from each other, the third horizontal sides of the first and second beam structures being positionable in the corresponding channel portions of the third surfaces of the first and second ribs such that the first and second ribs are slidably movable along the first and second beam structures;

each of the plurality of suspension support structures having a single axle member and suspension fixedly connected between the first and second ribs; and a plurality of fasteners configured to removably secure the first and second ribs of each of the plurality of suspension support structures to a corresponding portion of the first and second beam structures in a first releasable attachment in which the second surfaces of the first and second ribs are in a mutual facing relationship with the first sides of the corresponding portions of the first and second beam structures, respectively, with the plurality of fasteners removably connected therebetween at any selected engagement location of the plurality of engagement locations, each of the fasteners including a pin cage configured to removably engage the second surface of a corresponding rib of the first and second ribs and having a pin projecting therefrom for securing the pin cage to the corresponding beam structure, and wherein the plurality of fasteners are further configured to, when the vehicle is not in operation, allow for the first and second ribs to be released from the first releasable attachment with the portions of the corresponding beam structures at the selected engagement location, repositioned relative to the corresponding beam structures, and secured to the corresponding portions of the beam structures in at least a second releasable attachment at any other engagement location of the plurality of engagement locations, such that the plurality of suspension support structures are repositionable along the first and second spaced-apart beam structures to reconfigure the chassis structure between at least one of a wide spread configuration and a closed tandem configuration.

2. The reconfigurable suspension support apparatus of claim 1, wherein the pin cage of each fastener is configured to releasably secure a corresponding rib for the fastener to a corresponding beam structure using the pin projecting from the pin cage when the corresponding rib is positioned at any of the engagement locations.

3. The reconfigurable suspension support apparatus of claim 2, wherein the pin cage of each fastener includes a first vertically extending flange that is configured to be engaged with the second surface of the corresponding rib using a plurality of removable mechanical fasteners.

4. The reconfigurable suspension support apparatus of claim 3, wherein the pin cage of each fastener is integrally formed of the first vertically extending flange, a second vertically extending flange, and a transverse section that connects the first and second vertically extending flanges, wherein the pin projecting from the pin cage of each fastener projects from the second vertically extending flange and extends through a corresponding hole in the corresponding beam structure when the pin cage is releasably secured to the corresponding beam structure.

5. The reconfigurable suspension support apparatus of claim 3, wherein the second surface of the corresponding rib for each fastener is laterally offset from the first side of the corresponding beam structure when the pin cage of the fastener is releasably secured to the corresponding beam structure.

6. The reconfigurable suspension support apparatus of claim 1, wherein the reconfigurable suspension support structures are provided separately from and not integrated with the chassis structure.

7. The reconfigurable suspension support apparatus of claim 6, wherein the chassis structure includes a trailer body and one or more axle members, and the plurality of suspension support structures are utilized as additional axle members for the trailer body when attached to the chassis structure.

8. The reconfigurable suspension support apparatus of claim 7, wherein the trailer body is one of a semi-trailer body and a flatbed trailer body.

9. The reconfigurable suspension support apparatus of claim 6, wherein the plurality of suspension support structures are connected end to end and connected to an end of the suspension support apparatus to create a multi-axle fixed suspension support apparatus.

10. The reconfigurable suspension support apparatus of claim 9, wherein a spacing between adjacent axles of the multi-axle fixed suspension support apparatus is 49 inches or less.

11. The reconfigurable suspension support apparatus of claim 9, wherein the multi-axle fixed suspension support apparatus is configured to be converted to a movable suspension support apparatus.

12. The reconfigurable suspension support apparatus of claim 6, wherein the reconfigurable suspension support apparatus is configured to be converted to a movable suspension support apparatus in which the plurality of suspension support structures can be mounted to the trailer body such that a spacing between each two adjacent axles of the plurality of suspension support structures is 49 inches or less.

13. The reconfigurable suspension support apparatus of claim 1, wherein a respective suspension hanger is secured to and depends from each of the first and second ribs, and wherein the respective suspension hangers are configured to mount a suspension trailing arm and axle assembly to the fixed suspension support apparatus.

14. The reconfigurable suspension support apparatus of claim 13, wherein each of the respective suspension hangers is directly secured to a crossmember that connects and extends laterally between the first and second ribs.

15. A multi-axle suspension support apparatus for reconfigurably attaching to a chassis structure of a tractor vehicle, the chassis structure of the tractor vehicle having first and second longitudinally-extending and laterally spaced-apart beam structures, the first and second longitudinally-extending and laterally spaced-apart beam structures each having a plurality of engagement locations, the multi-axle suspension support apparatus comprising:

first and second reconfigurable suspension support structures, each reconfigurable suspension support structure comprising:

first and second longitudinally-extending and laterally spaced-apart ribs configured to be selectively positioned and aligned with any of the plurality of engagement locations formed on the first and second longitudinally-extending and laterally spaced-apart beam structures, each of the first and second ribs being L-shaped in cross-section and each having a first vertical surface, a second vertical surface on an opposite side of the rib from the first surface and a third horizontal surface, the first surface of the first rib and the first surface of the second rib facing each other and the second surface of the first rib and the second surface of the second rib facing away from each other, the third horizontal surface of the first and second ribs each defining a channel portion facing away from each other, each of the first and second beam structures being I-beam shaped in cross-section and each having at least a first vertical side, a second vertical side opposite the first side and a third horizontal side, the first side of the first beam structure and the first side of the second beam structure facing each other and the second side of the first beam structure and the second side of the second beam structure facing away from each other, the third horizontal sides of the first and second beam structures being positionable in the corresponding channel portions of the third surfaces of the first and second ribs such that the first and second ribs are slidably movable along the first and second beam structures, and a single axle member and suspension fixedly connected between the first and second ribs;

a plurality of fastener assemblies configured to be removably attached to the second surfaces of the first and second ribs and to removably secure the first and second ribs to the corresponding first and second beam structures in a first releasable attachment in which the second surfaces of the first and second ribs are in a mutual facing relationship with the first sides of the corresponding first and second beam structures, respectively, with the plurality of fasteners removably connected therebetween at any selected engagement location of the plurality of engagement locations, the plurality of fastener assemblies being further configured to allow for the first and second ribs to be released from the first releasable attachment with the corresponding beam structures at the selected engagement location and secured to the corresponding beam structures in at least a second releasable attachment at any other engagement location of the plurality of engagement locations; and an attachment unit configured to join the first and second reconfigurable suspension support structures to each other by securing corresponding ends of the first and second ribs of the first reconfigurable suspension support structure respectively to corresponding ends of the first and second ribs of the second reconfigurable suspension support structure, such that the first and second reconfigurable suspension support structures are repositionable along the first and second spaced-apart beam structures to reconfigure the chassis structure between at least one of a wide spread configuration and a closed tandem configuration.

\* \* \* \* \*